(12) United States Patent
Almasian et al.

(10) Patent No.: US 7,208,088 B2
(45) Date of Patent: Apr. 24, 2007

(54) SPIRAL WOUND FILTRATION MEMBRANE CARTRIDGE WITH CHEVRON SEAL

(75) Inventors: Joseph Almasian, Westford, MA (US); Stephen Dzengeleski, Arlington, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 10/443,589

(22) Filed: May 22, 2003

(65) Prior Publication Data

US 2003/0222011 A1   Dec. 4, 2003

Related U.S. Application Data

(60) Provisional application No. 60/383,922, filed on May 29, 2002.

(51) Int. Cl.
   *B01D 63/10*   (2006.01)
   *B01D 63/12*   (2006.01)
   *B01D 63/00*   (2006.01)

(52) U.S. Cl. .................. 210/321.76; 210/321.74; 210/321.85; 210/321.83

(58) Field of Classification Search ............... 210/650, 210/652, 321.74, 321.76, 321.83, 321.85
See application file for complete search history.

(56) References Cited

U.S. PATENT DOCUMENTS

| 3,966,616 A | 6/1976 | Bray |
| 4,016,083 A | 4/1977 | Sakaguchi et al. |
| 4,064,052 A | 12/1977 | Zimmerly |
| 4,301,013 A | 11/1981 | Setti et al. |
| 4,548,714 A | 10/1985 | Kirwan et al. |
| 4,906,372 A | 3/1990 | Hopkins |
| 5,128,037 A | 7/1992 | Pearl et al. ............ 210/321.74 |
| 5,128,307 A | 7/1992 | Wanjek et al. |

FOREIGN PATENT DOCUMENTS

| EP | 0 188 224 | 7/1986 |
| EP | 0 414 082 | 2/1991 |
| EP | 0 492 250 | 7/1992 |
| EP | 0 943 367 | 9/1999 |

*Primary Examiner*—Krishnan S. Menon
(74) *Attorney, Agent, or Firm*—Nields & Lemack

(57) ABSTRACT

A spiral wound filtration cartridge construction is provided which includes a cartridge positioned within a solid outer cylinder which, in turn is positioned within a solid outer cylinder which, in turn is positioned within a solid housing. Fluid flows within the space between the outer cylinder and housing is controlled by a ring and flexible chevron construction. The chevron construction includes outer peripheral holes, the sizes and number of which are set to determine by-pass flow.

5 Claims, 5 Drawing Sheets

SPIRAL WOUND FILTRATION MEMBRANE CARTRIDGE WITH CHEVRON SEAL

This application claims priority of Provisional Application Ser. No. 60/383,922 filed May 29, 2002.

BACKGROUND OF THE INVENTION

This invention relates to a spiral wound filtration cartridge construction utilized in fluid separation processes such as reverse osmosis or ultrafiltration. More particularly, this invention relates to a spiral wound filtration cartridge construction having a chevron seal construction with a partial feed bypass means which prevents fluid stagnation within and around the cartridge during use.

Prior to the present invention, spiral wound filtration cartridges have been provided comprising a centrally positioned tube about which are wound membrane sheets and suitable permeate spacers and feed spacers. The membrane sheets are V shaped and the feed spacers are positioned within the shaped membrane while the permeate spacers are positioned outside the V shaped membranes. The feed spacers promote passage of feed fluid into the V shaped membrane and the permeate spacers promote permeate flow from outside the V shaped membrane into holes through the walls of the centrally positioned conduit for recovery. The feed passes axially through the spiral wound membrane cartridge and retentate is recovered from the opposite end at which the feed is introduced. The filtration cartridge is held within a cylindrically shaped housing to provide mechanical strength to the cartridge during use.

It has been proposed to provide a controlled by pass of feed fluid within the space between the housing and the outside surface of the cartridge in order to prevent bacterial growth during use caused by clogging of the cartridge with retentate. U.S. Pat. No. 4,301,013 discloses the use of a tight fitting open mesh within the housing space between the cartridge and the housing to provide the desired by-pass flow. It has also been proposed in U.S. Pat. No. 4,548,714 to wrap the cartridge with a leaf of the feed spacer to provide for fluid flow around the cartridge. It has also been proposed by U.S. Pat. No. 4,906,372 to utilize a seamless porous rigid sleeve within the housing to separate the cartridge from the housing and to provide for feed by-pass. These cartridges are difficult to produce with the requisite tolerance needed to permit their use in the field, particularly when it is desired to change the cartridge within the housing. That is, these cartridge and housing arrangements are difficult to replace in the field since each cartridge-housing arrangement varies in size and shape.

It has also been proposed in U.S. Pat. No. 5,128,037 to provide a filtration cartridge construction having a spiral wound filtration cartridge positioned within a cylindrical tube which, in turn, is positioned within a cylindrical housing. The space between the tube and the housing is sealed by a chevron shaped flexible seal secured to an end plate which is fixed to the cylindrical tube. Holes are provided in the end plate to permit fluid flow between the cylindrical tube and the housing thereby to prevent bacterial growth in the space between the tube and the housing. This use of the end plate to secure the chevron seal is undesirable since the end plate is expensive and sealing is usually effected by ultrasonic welding which is time consuming and requires expensive apparatus. Alternatively, an adhesive or potting compound can be utilized to secure the chevron seal. However, this is undesirable since they can be a source of undesirable extractables that can mix with the permeate.

Accordingly, it would be desirable to provide a filtration cartridge construction which affords a controlled feed bypass means to maintain the construction clean during use. It also would be desirable to provide a filtration cartridge construction which can be easily utilized in the field to permit cartridge replacement when needed. It would also be desirable to provide such a construction wherein the required seal can be properly positioned without the need for an end cap or adhesives.

SUMMARY OF THE INVENTION

This invention provides a spiral wound filtration cartridge construction wherein a spiral wound filtration cartridge is positioned within a rigid solid cylindrical outer tube which, in turn, is positioned within a solid cylindrical housing. A seal construction is provided to direct fluid to be filtered into the spiral wound filtration cartridge and to provide controlled fluid flow in a space between the tube and the housing. The seal comprises a chevron-shaped flexible member which is held in place on the tube by a flexible retaining ring which fits on one leg of the chevron seal. The seal is provided with small holes which direct a portion of a fluid feed into the space between the tube and the housing.

The seal construction of this invention provides substantial advantages over the use of adhesive or potting compositions including the fact that it can be completely installed immediately rather than waiting approximately 2–3 days for complete setting of the composition. In addition, the adhesive or potting composition deteriorates over time, producing extractables and reducing the effectiveness of the seal. Furthermore, the seal construction of this invention is not limited to specific adhesive compositions thereby permitting the use of a wide variety of materials for forming the seal construction. Finally, the seal construction of this invention is more robust than the seal construction of the prior art since it does not deteriorate significantly over time.

The filtration cartridge is formed by spirally winding one of a plurality of V-shaped filtration membranes, porous feed screens and porous permeate screens about a central tube having holes which are in selective fluid communication with the permeate screens. The filtration cartridge can be wrapped about its entire outside surface with a fluid permeable layer such as the permeate screen or feed screen and is tightly fit within the outer tube. The outer tube, in turn, is fit within the housing. One end of the outer tube is provided with a retentate recovery means. One or both ends are provided with permeate recovery means. The outer tube and the fluid feed means permit construction of the portion of the cartridge apparatus that fits into the outer tube in a controlled manufacturing environment so that the size and shape of this portion of the apparatus can be controlled easily. This, in turn, provides ease of cartridge replacement in the field.

DESCRIPTION OF SPECIFIC EMBODIMENTS

Figure 1:
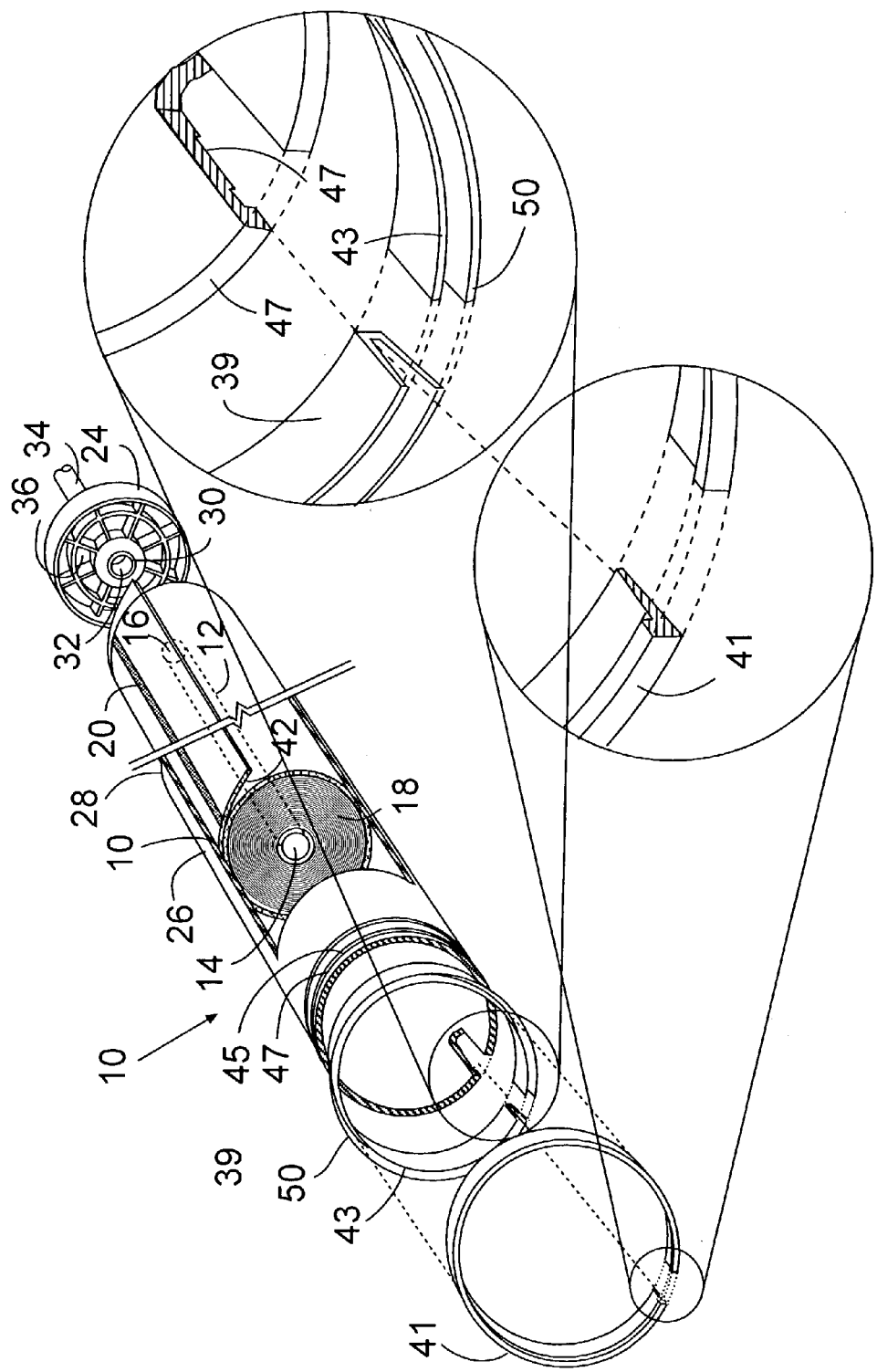
FIG. 1 is an exploded view of the cartridge apparatus of this invention without the fluid feed means.

Referring to FIG. 1, the spiral wound apparatus of this invention 10 (excluding the outer housing and fluid feed means) includes a central tube 12 having an exit 14 and an exit 16 for recovering permeate from the apparatus 10. Optionally, one of the exits 14 or 16 can be blocked so that the permeate is recovered only from one exit 14 or 16. The spiral wound filtration cartridge 18 is comprised of the elements shown in FIG. 2 which will be described herein below. The spiral wound portion 18 includes an axial seal 20 which serves to prevent retentate and permeate from mixing. An end plate 24 is sealed to rigid solid outer tube 26 about the periphery 28 and to the periphery of exit 16 at the inner periphery 30 of end plate 24. The end plate 24 is not required for use in this invention. Exit 32 is in fluid communication with central tube 12 and permeate recovery conduit 34. Retentate exits form spiral surface 33 of spiral cartridge 18 through exit holes 36 in end plate 24 and is recovered. The cartridge 18 is enclosed in permeate screen 42 so as to provide a porous spacing between the spiral wound cartridge 18 and outer tube 26. If desired, the cartridge can be enclosed by a feed screen 40 or with any porous sheet such as cylindrical screen. However, it is preferred to utilize the permeate screen 42 to wrap the outside surface of cartridge 18 because the permeate screens 42 typically are denser than the feed screen 40 which reduces flow and therefore waste. Also, the permeate screen 42 are attached to central tube 12 and to the end adhesive 20 which reduces or eliminate screen slippage. The end adhesive 20 prevents feed fluid in screen 40 from mixing with permeate produced within cartridge. A chevron seal 39 having legs 43 and 50 is provided and is retained on outer tube 26 by a flexible ring 41 which positions leg 43 of seal 39 within slot 45. Ring 41 is positioned within slot 47 thereby to retain seal 39 against the outside surface 49 of tube 26. The seal 39 is provided with holes 51 which permit a portion of the feed to by-pass the filtration cartridge 18.

Figure 2:
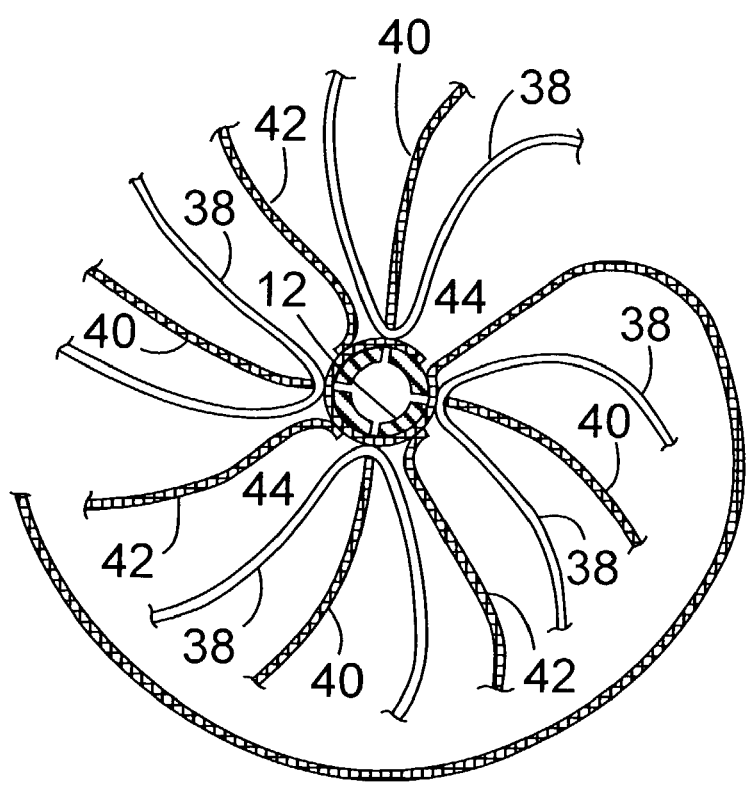
FIG. 2 is a cross-sectional view of a filtration cartridge useful in the present invention prior to being spirally wound.

Referring to FIG. 2, an unwound cartridge 18 is depicted showing the central tube 12 surrounded by a plurality of V shaped membranes 38, feed screens 40 are positioned within the membranes 38 and permeate screens 42 are positioned outside the membranes 38. The lateral edges of the permeate screens 42 at the end of the cartridge adjacent the fluid feed means are sealed to the adjacent membranes 38 so as to prevent feed fluid from entering the permeate screens 42 such as disclosed in U.S. Pat. No. 3,966,616 which is incorporated herein by reference. The V shaped membranes can be any fluid permeable membrane such as an ultra-filtration, reverse osmosis or a microporous membrane. The membranes 38 and screens 40 and 42 are spirally wound about the central tube 12 with the outside wrapping of the cartridge 18 comprising the elongated permeate screen 42 shown in FIG. 2. However, the outside wrapping can be formed from a plurality of overlapping permeate or feed screens and can be more than one screen in thickness if desired. The permeate screen 42 are attached to central tube 12. The cartridge 18 then is sealed axially by adhesive 20 so as to prevent feed fluid from entering the working portion of the permeate screens 42. The outside wrap of permeate screen 42 provides a means for feed fluid to enter it and to clean the space between the outer surface of the spiral wound cartridge 18 and the inner surface of outer tube 26. The permeate screen 42 typically is made of woven fabric such as polypropylene or polyester or knitted fabric such as Tricot. The feed screen 40 typically is made from polypropylene or polyethylene extruded netting or woven fabric. In use, feed fluid enters the feed screens 40 at one spiral wound surface of cartridge 18. Permeate passes through the membranes 38 into permeate screens 42, through holes 44 and out of tube 12 and through recovery conduit 34. During manufacture, the spiral wound cartridge 18 is inserted into tube 26. The solid tube 26 provides a constant size and shape for the cartridge 18 so that it can be replaced easily within a cylindrical housing.

Figure 3:
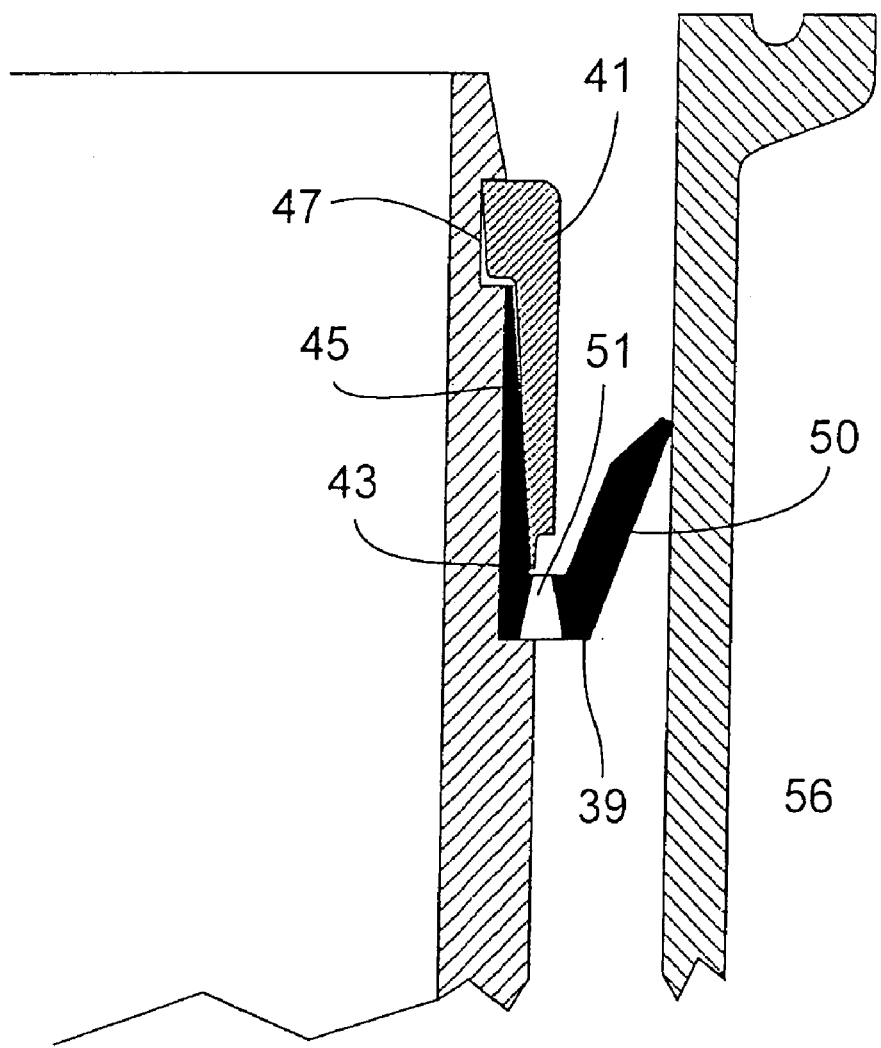
FIG. 3 is a partial cross sectional view of the seal of FIG. 4.
Figure 4:
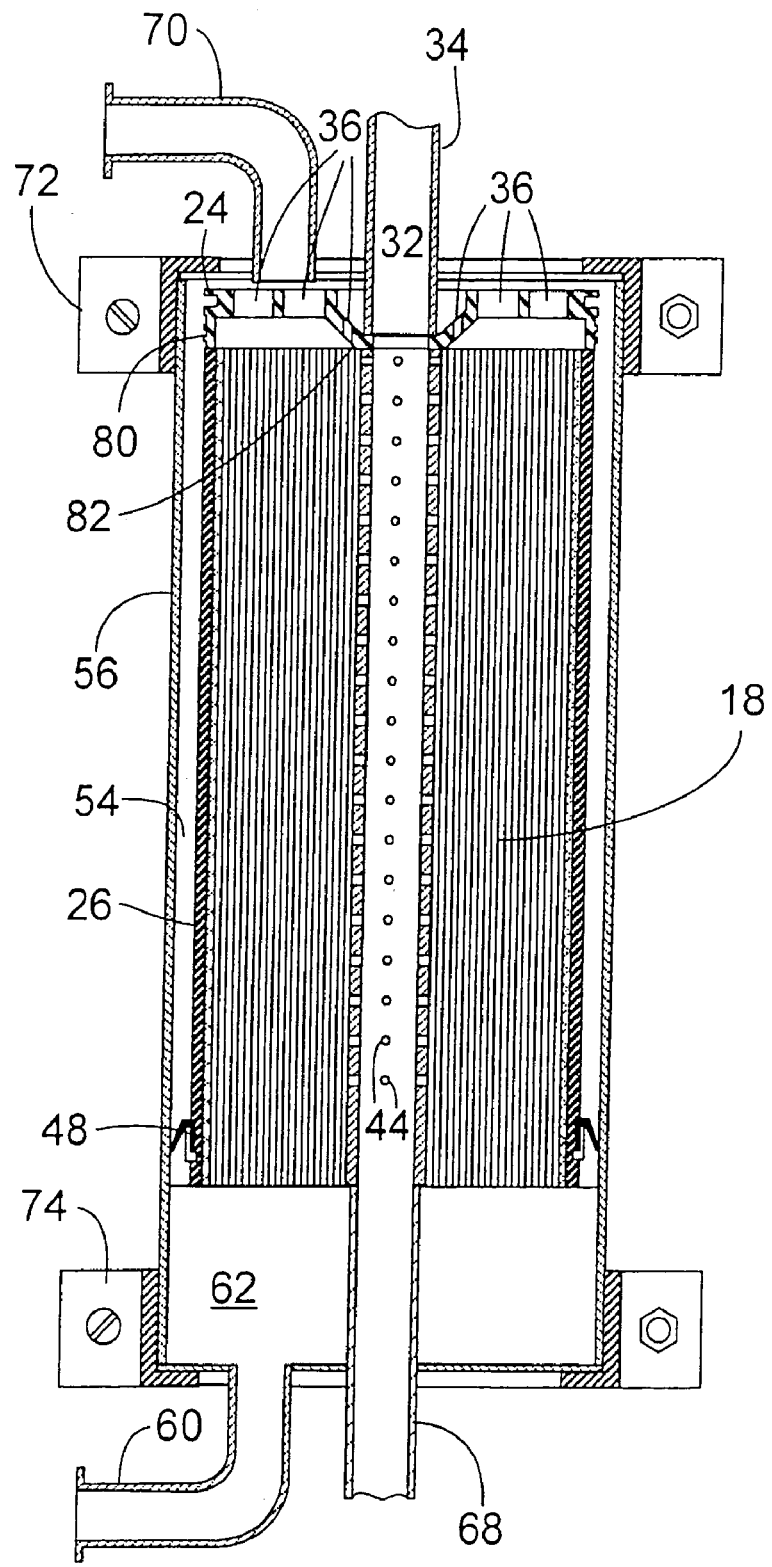
FIG. 4 is a cross sectional view of the apparatus of this invention.
Figure 5:
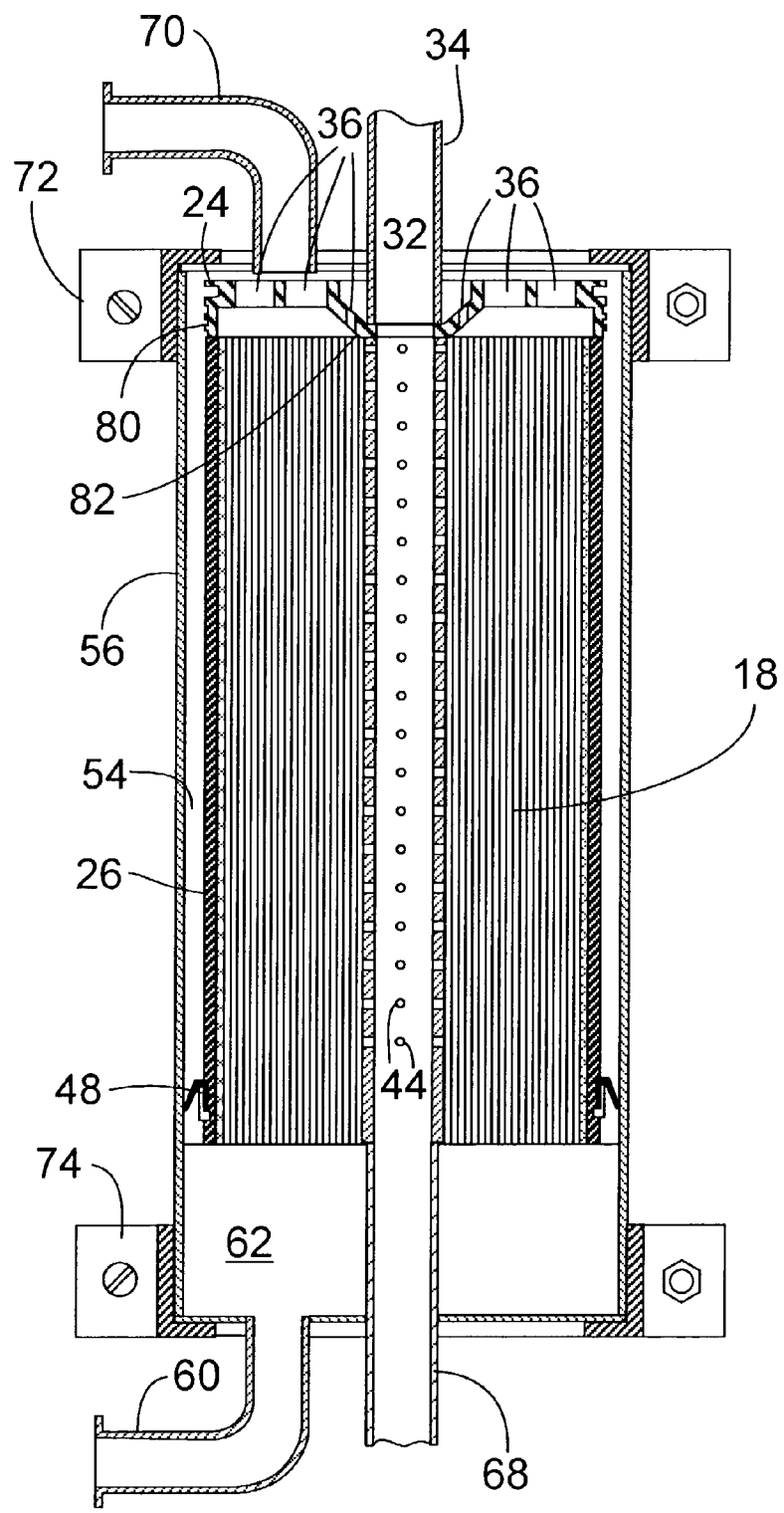

Referring to FIGS. 3 and 4, the chevron seal 39 includes a plurality of peripheral holes 51 which provide fluid communication for feed flow into the space 54 between outer tube 26 and housing 56 (see FIG. 4). The central hole 14 provides an outlet for permeate produced within cartridge 18. The size and number of the holes 51 controls the rate of by-pass flow. Flexible retaining ring 41 is positioned about the periphery of and within the peripheral slot 47 of tube 26. Under the pressure of incoming fluid feed, the leg 50 of chevron seal 39 seals against the inner surface of housing 56 to effect fluid flow into filtration cartridge 18 and to prevent by-pass flow other than that directed through the holes 51. The chevron seal 39 prevents flow other than through the holes 51 so that fluid flow within space 54 is accurately controlled. The fluid flow within space 54 prevents clogging and bacterial growth within the space 54.

As shown in FIG. 4, fluid feed passes through conduit 60, into manifold 62 and into cartridge 18. Permeate produced within cartridge 18 passes through holes 44 of inner tube 12 and permeate exits conduits 34 and 68. Retentate passes from cartridge 18 through holes 36 in end plate 24 and out retentate conduit 70. End plate 24 is bonded to outer tube 26 and inner tube 12 at surfaces 80 and 82. End plate 24 is not required in the apparatus of this invention. In addition, the chevron seal 39 with bypass holes 51 can be positioned at the retentate end of cartridge 18 to replace end plate 24 if desired. When it is desired to replace the unitary construction with another unitary construction comprising the rigid solid outer tube 26, cartridge 18 and end plates 45, clamps 72 and 74 are released and the unitary construction is replaced with another unitary construction within cylindrical housing 56. As set forth above, either outlet 14 or outlet 32 can be sealed so that permeate is recovered from one exit rather than two exits.

The invention claimed is:

1. A spiral wound apparatus installable into a solid housing to thereby enable filtering of a fluid to produce a permeate and a retentate, the spiral wound apparatus comprising:
   a separation cartridge having at least one membrane, a plurality of porous feed screens and a pluraity of porous permeate screens spirally wound about a central tube having a hollow interior, said separation cartridge having an outer fluid permeate wrap;
   a rigid nonporous solid outer tube housing said separation cartridge, said solid outer tube housable within a said solid housing such that said solid housing is spaced apart from said outer tube to form a space, said solid outer tube having a slot provided onto an outer surface of said solid outer tube at an inlet or an outlet for said tube; and
   a chevron-shaped seal having holes, said chevron-shaped seal located when installed in said space between said solid housing and said outer tube and secured to said outer tube at said slot by a flexible ring in contact with said seal about the periphery of said seal, said ring-secured chevron-shaped seal capable of controlling the flow of fluid in said space by preventing flow thereinto other than through said holes;

wherein said solid outer tube further comprises a second slot provided on the outer surface of said tube, and wherein a portion of said flexible ring is positioned in said second slot.

2. The spiral wound apparatus of claim 1, wherein said flexible ring comprises a flange portion shaped to fit in said second slot.

3. The spiral wound apparatus of claim 1, wherein said seal is positioned at said inlet of said solid outer tube.

4. The spiral wound apparatus of claim 1, wherein said seal is positioned at said outlet of said solid outer tube.

5. The spiral wound apparatus of claim 1, wherein said second slot is a peripheral slot.

* * * * *